US012090528B2

(12) United States Patent
Kim

(10) Patent No.: US 12,090,528 B2
(45) Date of Patent: Sep. 17, 2024

(54) APPARATUS AND METHOD FOR AUTOMATIC CLEAN CONNECTION

(71) Applicant: HOSAN TECH CO., LTD., Anseong-si (KR)

(72) Inventor: Chul Won Kim, Anseong-si (KR)

(73) Assignee: HOSAN TECH CO., LTD., Anseong-si (KR)

( * ) Notice: Subject to any disclaimer, the term of this patent is extended or adjusted under 35 U.S.C. 154(b) by 679 days.

(21) Appl. No.: 17/217,292

(22) Filed: Mar. 30, 2021

(65) Prior Publication Data

US 2022/0307635 A1 Sep. 29, 2022

(30) Foreign Application Priority Data

Mar. 29, 2021 (KR) ........................ 10-2021-0040118

(51) Int. Cl.
*B08B 3/08* (2006.01)
*B08B 5/00* (2006.01)
*B08B 13/00* (2006.01)

(52) U.S. Cl.
CPC .................. *B08B 3/08* (2013.01); *B08B 5/00* (2013.01); *B08B 13/00* (2013.01)

(58) Field of Classification Search
CPC .. B08B 3/08; B08B 5/00; B08B 13/00; B08B 9/021; B08B 9/023; B67D 7/0288; B67D 7/78
See application file for complete search history.

(56) References Cited

U.S. PATENT DOCUMENTS

2020/0032947 A1* 1/2020 Hasunuma .............. F16L 21/03

FOREIGN PATENT DOCUMENTS

| | | | | |
|---|---|---|---|---|
| JP | 03-53034 | B2 | | 8/1991 |
| JP | 08-296782 | A | | 11/1996 |
| JP | 2921654 | B2 | | 7/1999 |
| KR | 100720826 | B1 | | 5/2007 |
| KR | 10-2016-0131141 | A | | 11/2016 |
| KR | 10-2017-0142412 | A | | 12/2017 |
| KR | 20200122907 | A | * | 10/2020 |

OTHER PUBLICATIONS

Machine Translation of Bong et al., KR20200122907A, Oct. 2020. (Year: 2020).*

* cited by examiner

*Primary Examiner* — David G Cormier
(74) *Attorney, Agent, or Firm* — NKL Law; Jae Youn Kim

(57) ABSTRACT

An apparatus and method for automatic clean connection that is capable of automatically performing the connection and separation of a male coupler to and from a female coupler and cleaning and drying liquid contact parts of the male coupler and the female coupler. According to the present invention, the apparatus for automatic clean connection, which loads or unloads chemicals from one side tank into the other side tank, the apparatus including: a main body having a female coupler connected to the other side tank; a coupler connection module for moving a male coupler connected to one side tank in a direction of a y-axis to allow the male coupler to be fastened to or separated from the female coupler; and a coupler cleaning module for cleaning or drying liquid contact parts of the male coupler and the female coupler.

7 Claims, 11 Drawing Sheets

APPARATUS AND METHOD FOR AUTOMATIC CLEAN CONNECTION

CROSS REFERENCE TO RELATED APPLICATION OF THE INVENTION

The present application claims the benefit of Korean Patent Application No. 10-2021-0040118 filed in the Korean Intellectual Property Office on Mar. 29, 2021, the entire contents of which are incorporated herein by reference.

BACKGROUND OF THE INVENTION

Field of the Invention

The present invention relates to an apparatus and method for automatic clean connection, and more particularly, to an apparatus and method for automatic clean connection that is capable of automatically loading and unloading chemicals into and from a large-sized tank container for the transport of liquids under a clean environment.

Background of the Related Art

In a semiconductor fabrication plant, generally, various kinds of chemicals are loaded into a tank lorry and transported to the plant, and unloaded into a storage tank of the plant. So as to perform the loading and unloading, accordingly, a quick coupler is used.

The quick coupler includes a male coupler and a female coupler and serves to connect tubular members like hoses or pipes to each other or release the connected state of the tubular members, without any separate coupling tool. Through the connection between the male coupler and the female coupler or the release of their connected state, the internal flow paths of the tubular members communicate with each other or are released from the communicating state.

In specific, many of the chemicals used in the semiconductor fabrication plant are acidic or alkaline toxic substances, and if safety accidents happen, accordingly, serious harm may be applied to human health. When the quick coupler is connected and separated, that is, the chemicals applied to liquid contact parts may come into contact with a worker or other materials, and therefore, it is important to prevent the occurrence of such pollution.

When a quick coupler having a relatively large size greater than 1½" (40 A) is connected and released from the connection, many workers are needed, and they overwork, thereby increasing the possibility that they are exposed to dangerous substances.

SUMMARY OF THE INVENTION

Accordingly, the present invention has been made in view of the above-mentioned problems occurring in the related art, and it is an object of the present invention to provide an apparatus and method for automatic clean connection that is capable of automatically performing the connection and separation of a male coupler to and from a female coupler and cleaning and drying liquid contact parts of the male coupler and the female coupler.

To accomplish the above-mentioned object, according to one aspect of the present invention, there is provided an apparatus for automatic clean connection, which loads or unloads chemicals from one side tank into the other side tank, the apparatus including: a main body having a female coupler connected to the other side tank; a coupler connection module for moving a male coupler connected to one side tank in a direction of a y-axis to allow the male coupler to be fastened to or separated from the female coupler; and a coupler cleaning module for cleaning or drying liquid contact parts of the male coupler and the female coupler.

According to the present invention, desirably, the coupler cleaning module surrounds the outer periphery of the female coupler and has an inlet formed on one side periphery thereof in a circumferential direction to introduce a cleaning or drying fluid thereinto and an outlet formed on the other side periphery thereof in the circumferential direction, so that the fluid introduced into the inlet flows to the form of cyclones to allow the interior of the coupler cleaning module to be cleaned or dried.

According to the present invention, desirably, the coupler cleaning module performs the cleaning or drying in a state where the male coupler is close to the female coupler before the male coupler is completely coupled to the female coupler or after the male coupler has been separated from the female coupler.

According to the present invention, desirably, the apparatus further includes an alignment module for moving the male coupler in a direction of an x-axis to allow the male coupler to be aligned with a right position of the female coupler.

According to the present invention, desirably, the alignment module includes: a base plate; a pinion rotatably connected to the base plate; a pinion driving part for rotating the pinion; one pair of clamp guide rails extended in parallel with each other in the direction of the x-axis in such a manner as to place the pinion therebetween; clamp sliders guided by the clamp guide rails and having racks coupled to the pinion; and alignment clamps coupled to the clamp sliders in such a manner as to align the male coupler through movements in the direction of the x-axis.

According to the present invention, desirably, the alignment module further includes a two-stage control cylinder coupled to one side of the base plate in such a manner as to restrict the clamp sliders in the direction of the x-axis and to release the restriction to thus control the stroke of the clamp sliders to two stages.

According to the present invention, desirably, the coupler connection module includes: a grip part for fixedly gripping a flange of the male coupler; and a driving part for moving the grip part in the direction of the y-axis.

According to the present invention, desirably, the grip part includes: a grip casing having a hole formed at the center thereof to pass the flange of the male coupler therethrough; at least one pair of grippers coupled to the grip casing to bite the flange of the male coupler; one pair of x-axis moving blocks facing each other in the direction of the x-axis, to which the grippers are fixed; guide grooves formed obliquely on tops of the x-axis moving blocks; an ascending and descending block inserted into the guide grooves in such a manner as to be guided upward and downward; ascending and descending cylinders having ascending and descending rods coupled to the ascending and descending block; and a guide housing inserted into top ends of the x-axis moving blocks to slidingly guide the x-axis moving blocks in the direction of the x-axis.

According to the present invention, desirably, the x-axis moving blocks have escape prevention clamps located on the respective side surfaces thereof, and each escape prevention clamp has support projections spaced apart from each other by the thickness of the flange of the male coupler in the direction of the y-axis, so that at the same time when the grippers grip the male coupler, the support projections are locked onto both end peripheries of the flange of the male coupler.

According to the present invention, desirably, the driving part includes: a y-axis moving block to which the guide housing is coupled; a grip part guide rail for slidingly guiding the y-axis moving block in the direction of the y-axis; a frame to which the grip part guide rail is coupled; and driving means for controlling the stroke of the y-axis moving block to two stages.

To accomplish the above-mentioned object, according to another aspect of the present invention, there is provided a method for automatic clean connection, through which chemicals are loaded or unloaded from one side tank into the other side tank, the method including the steps of: closing alignment clamps to allow a male coupler to be aligned in a direction of an x-axis; operating ascending/descending cylinders to allow grippers to bite the outer periphery of a flange of the male coupler; opening the alignment clamps to allow a path through which the grippers pass to be provided; operating driving means to allow the male coupler to move to a coupler cleaning module; operating the coupler cleaning module to allow liquid contact parts of the male coupler and a female coupler to be cleaned or dried; and operating the driving means to allow the male coupler to be completely fastened to the female coupler.

According to the present invention, desirably, the step of aligning the male coupler in the direction of the x-axis includes the steps of: operating a pinion driving part to allow the alignment clamps to be closed to one stage in the direction of the x-axis; and locating the male coupler between the alignment clamps and operating a two-stage control cylinder to allow the alignment clamps to be closed to two stages in the direction of the x-axis.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Figure 1:
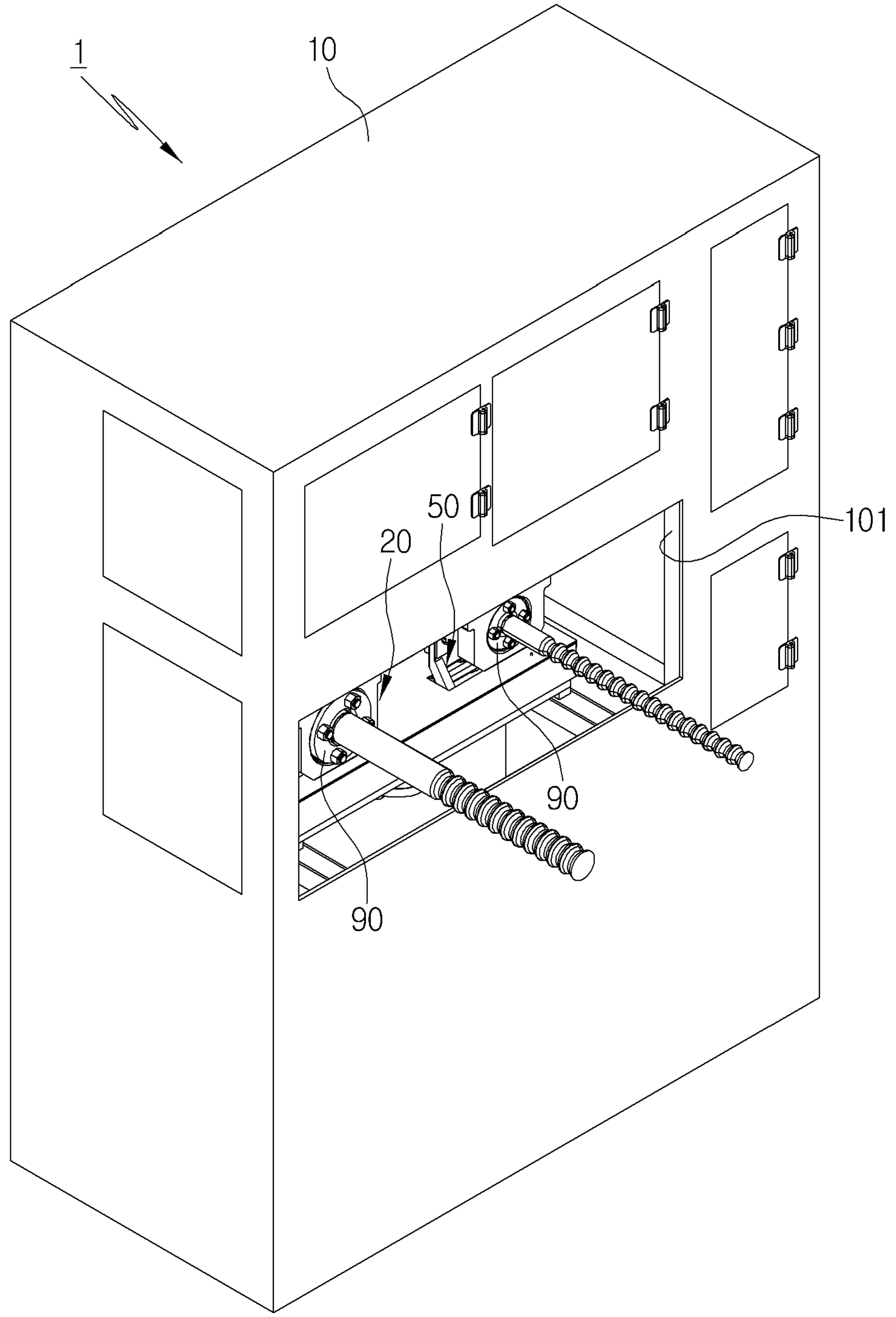
FIG. 1 is a perspective view showing an apparatus for automatic clean connection according to the present invention.
Figure 2:
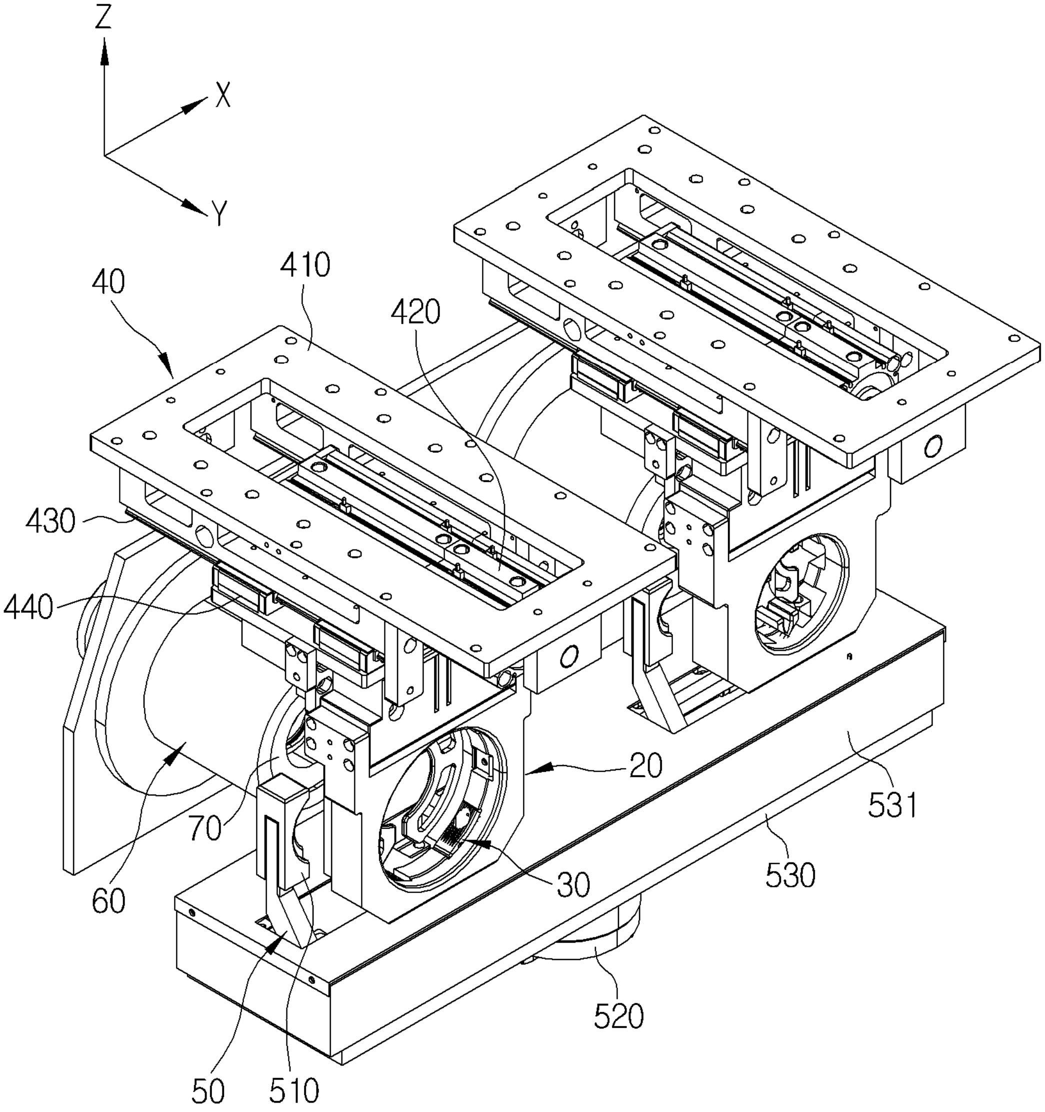
FIG. 2 is a perspective view showing an interior of the apparatus for automatic clean connection according to the present invention.
Figure 3:
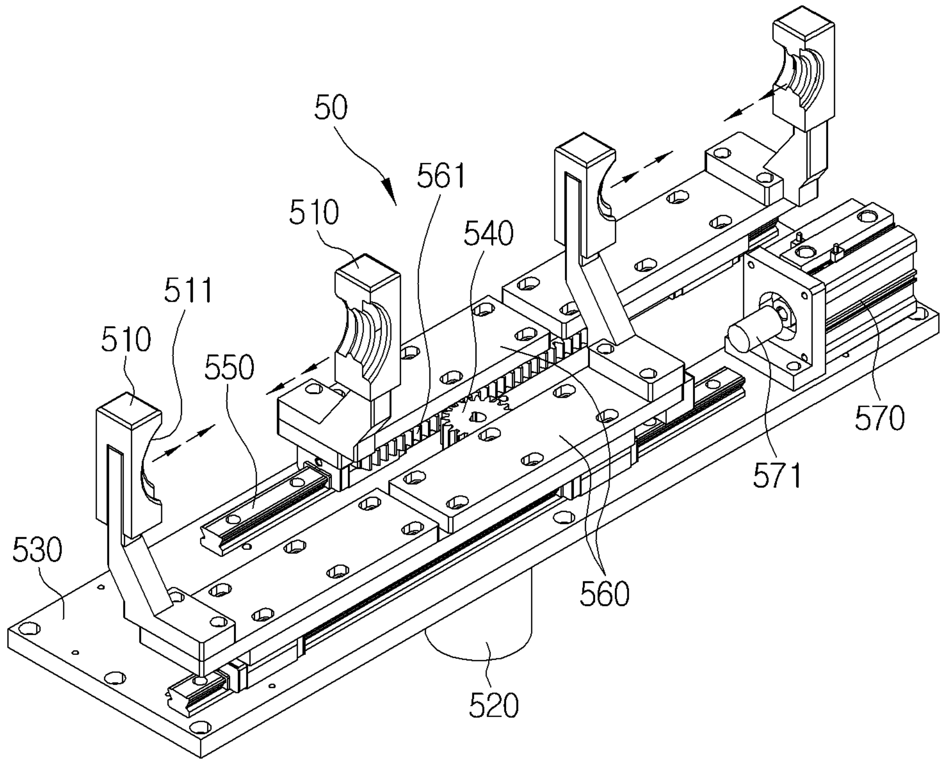
FIG. 3 is a perspective view showing an alignment module of the apparatus for automatic clean connection according to the present invention.
Figure 4:
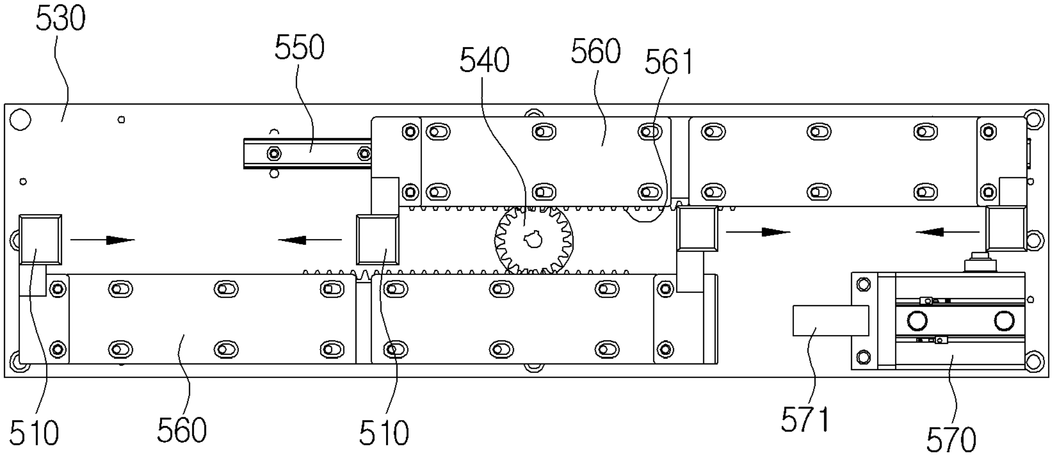
FIG. 4 is a plan view showing the alignment module of FIG. 3.
Figure 5:
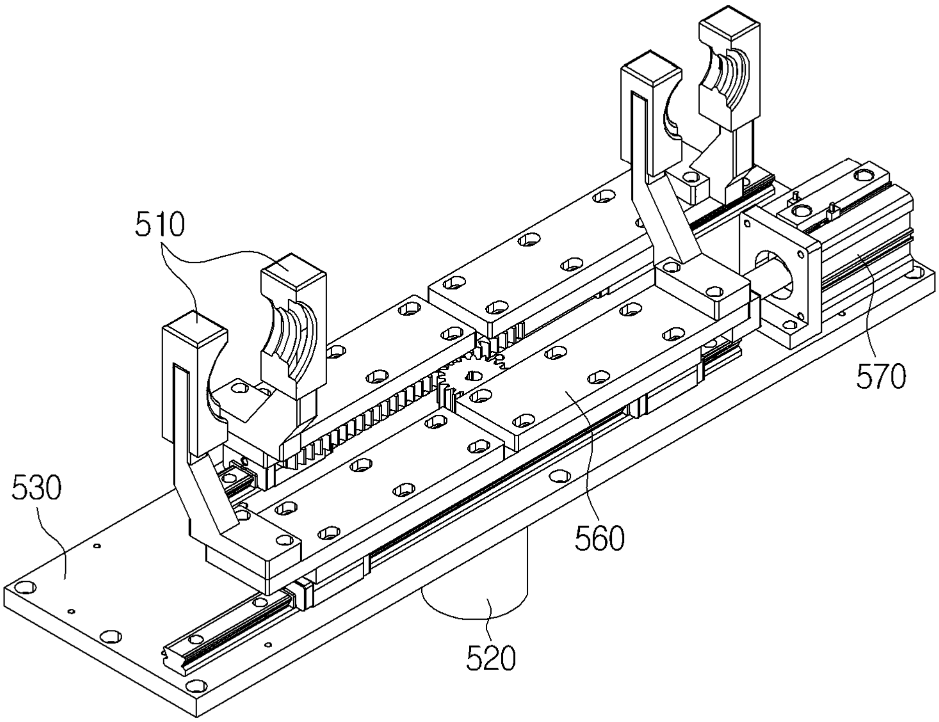
FIG. 5 is a perspective view showing an operating example of the alignment module of FIG. 3.
Figure 6:
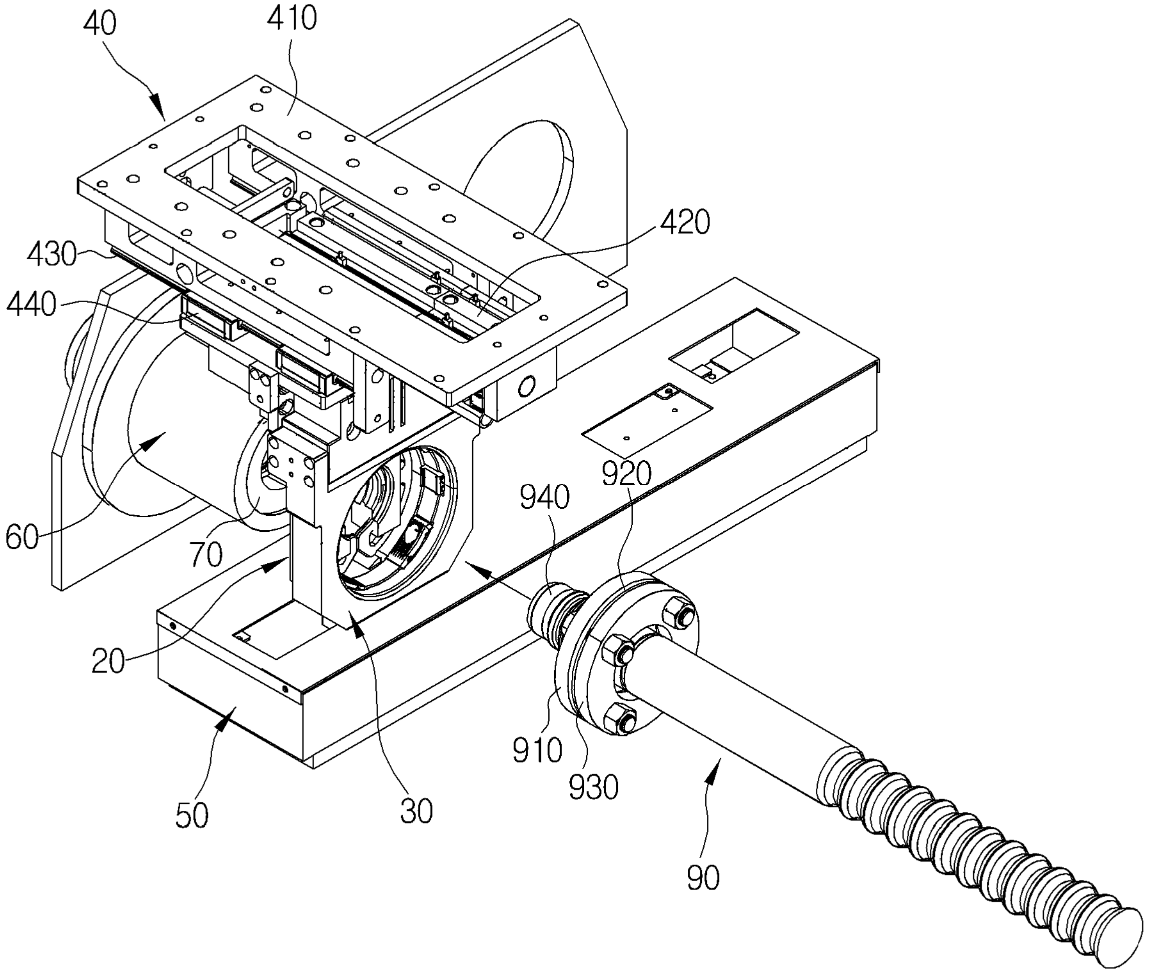
FIG. 6 is a perspective view showing an example where a male coupler is fastened to the apparatus for automatic clean connection according to the present invention.

Hereinafter, an apparatus and method for automatic clean connection according to the present invention will be described in detail below with reference to the accompanying drawings. In the description, a direction of an x-axis in FIG. 2 indicates a longitudinal direction, a direction of a y-axis therein a transverse direction, and a direction of a z-axis therein a height direction. However, such directions are set for the convenience of the description, and therefore, the present invention is not limited necessarily thereto.

Referring to FIGS. 1 to 10, an apparatus 1 for automatic clean connection according to the present invention serves to load or unload chemicals from one side tank into the other side tank, and for example, the apparatus 1 can be used in a place where the chemical in a tank lorry of a semiconductor fabrication plant is loaded or unloaded into a storage tank of the plant. The apparatus 1 includes a main body 10, an alignment module 50, a coupler connection module 20, and a coupler cleaning module 60.

The main body 10 is installed between one side tank (the storage tank of the plant) and the other side tank (the tank lorry) and has female couplers 70. The female couplers 70 are connected to the storage tank of the plant, and as they are connected to male couplers 90 or are released from the connection state to the male couplers 90, internal flow paths communicate with each other or they are released from the communication. The male couplers 90 are connected to the tank lorry, and when they are fastened to the female couplers 70, the chemical in the storage tank of the plant is loaded into the tank lorry. Otherwise, the chemical in the tank lorry is unloaded into the storage tank of the plant.

The main body 10 has a box-like shape and constitutes a housing of the apparatus 1 for automatic clean connection. For example, the main body 10 is installed in front of the storage tank of the plant and is configured to allow two male couplers 90 drawn from the tank lorry as a large-sized tank container for the transport of chemicals to be connected thereto. The two male couplers 90 may be provided differently with a male coupler for liquid transport and a male coupler for gas transport and may be different in diameter from each other. Further, of course, three or more male couplers 90 or a single male coupler 90 may be provided.

Each male coupler 90 includes a flange 910 and a liquid contact part 940 provided on one side end portion of the flange 910 in such a manner as to be coupled to the corresponding female coupler 70. The flange 910 is fastened to a hose flange 930 by means of bolts, and the hose flange 930 is coupled to the end periphery of a hose connected to the tank lorry. A gasket 920 is provided between the flange 910 and the hose flange 930 to ensure sealing therebetween.

The main body 10 has an entrance 10 formed on the front surface thereof, and the entrance 10 is open and closed by means of doors. One door rotates upward to be open around a hinge shaft disposed on the top side of the entrance 10, and the other door rotates downward to be open around a hinge shaft disposed on the bottom side of the entrance 10. The doors have semicircular holes formed on the center thereof, and when the doors are open and closed, the male couplers 90 can be freely moved in the direction of the y-axis, with no interference with the doors. The main body 10 may have a control panel for controlling the operations of the apparatus 1.

The alignment module 50 serves to move the male couplers 90 in the direction of the x-axis to allow the male couplers 90 to be aligned with right positions of the female couplers 70. The alignment module 50 includes a base plate 530, a pinion 540, a pinion driving part 520, clamp guide rails 550, clamp sliders 560, alignment clamps 510, and a two-stage control cylinder 570. The base plate 530 has the shape of a rectangular plate with a given thickness and long in the direction of the x-axis, and top of the base plate 530 is covered with a cover 531. The cover 531 has a plurality of holes extended long in the direction of the x-axis in such a manner as to allow the alignment clamps 510 to be freely moved in the direction of the x-axis.

The pinion 540 is rotatably connected to the base plate 530. The pinion 540 is located on the center of the base plate 530 in the direction of the x-axis and in the direction of the y-axis. The pinion driving part 520 is a motor that is fixed vertically to the underside of the base plate 530 to rotate the pinion 540. A motor shaft of the pinion driving part 520 passes through the base plate 530 and is then coupled to the pinion 540.

The clamp guide rails 550 are coupled to top of the base plate 530 and are extended in parallel with each other in the direction of the x-axis in such a manner as to place the pinion 540 therebetween. The clamp guide rails 550 are spaced apart from each other in the direction of the y-axis in such a manner as to be parallel with each other. The clamp guide rails 550 are connected to the clamp sliders 560 to slidingly guide the clamp sliders 560 in the direction of the x-axis.

The clamp sliders 560 are guided by the clamp guide rails 550 and are slidingly moved along the clamp guide rails 550 in the direction of the x-axis. A rack 561 is located on one surface of each clamp slider 560 facing the pinion 540. The rack 561 is gear-coupled to the pinion 540, and through the rotation of the pinion 540, the clamp sliders 560 are linearly moved in the direction of the x-axis.

One pair of alignment clamps 510 is coupled to tops of the clamp sliders 560 in such a manner as to be reciprocatedly moved in the direction of the x-axis. Through the movements of the alignment clamps 510 in the direction of the x-axis, the male couplers 90 are aligned with the fastening positions to the female couplers 70. The alignment clamps 510 have streamlined curved portions 511 formed on the surfaces facing the male coupler 90. The curved portions 511 have the corresponding shape to the liquid contact part 940 of the male coupler 90 to enhance the contact force with the male coupler 90.

Both side alignment clamps 510 with respect to the male coupler 90 are bent to be close to each other in the direction of the y-axis, so that they are located on the same line as each other in the direction of the x-axis. That is, one side alignment clamp 510 with respect to the male coupler 90 is bent and extended backward from top surface of the clamp slider 560, and the other side alignment clamp 510 with respect to the male coupler 90 is bent and extended forward from top surface of the clamp slider 560. Accordingly, the curved portions 511 of the alignment clamps 510, which are tightly contacted with the liquid contact part 940 of the male coupler 90, are located on the same line as each other in the direction of the x-axis.

The two-stage control cylinder 570 is coupled to one side of the base plate 530 and restricts the clamp sliders 560 in the direction of the x-axis and releases the restriction, thereby controlling the stroke of the clamp sliders 560 to two stages. A rod 571 of the two-stage control cylinder 570 is moved forward toward the clamp sliders 560 in the direction of the x-axis to restrict the movements of the clamp sliders 560 in the direction of the x-axis. Further, the rod 571 of the two-stage control cylinder 570 is moved backward toward the opposite direction to the clamp sliders 560 in the direction of the x-axis to release the restriction in the movements of the clamp sliders 560 in the direction of the x-axis, so that the clamp sliders 560 can be moved further in the direction of the x-axis.

When one pair of alignment clamps 510 is open to the maximum in the direction of the x-axis, a grip part 30 of the coupler connection module 20 can freely pass through the open space. At the position where one pair of alignment clamps 510 is open to the maximum, if the pinion 540 is rotated through the operation of the pinion driving part 520, one pair of alignment clamps 510 is closed. In this case, the rod 571 of the two-stage control cylinder 570 restricts the movements of the clamp sliders 560 so that the stroke of the clamp sliders 560 is controlled to one stage. In this case, one pair of alignment clamps 510 is open just to a degree where the liquid contact part 940 of the male coupler 90 can freely pass therethrough.

After that, if the male coupler 90 is inserted between one pair of alignment clamps 510, the two-stage control cylinder 570 operates to allow the rod 571 to move backward. Accordingly, the restricted states of the clamp sliders 560 are released to permit the stroke of the clamp sliders 560 to be controlled to two stages by means of the power of the pinion driving part 520. As a result, the male coupler 90 inserted between one pair of alignment clamps 510 is aligned by means of the alignment clamps 510. If the male coupler 90 is firmly held by means of the grip part 30 of the coupler connection module 20, the pinion driving part 520 operates to rotate the pinion 540 in the opposite direction so that one pair of alignment clamps 510 is open to the maximum in the direction of the x-axis.

The coupler connection module 20 moves the male coupler 90 in the direction of the y-axis to allow the male coupler 90 to be fastened to or separated from the female coupler 70. The coupler connection module 20 includes the grip part 30 and a driving part 40. The grip part 30 serves to fixedly grip the flange 910 of the male coupler 90. The driving part 40 serves to reciprocatedly move the grip part 30 in the direction of the y-axis.

The grip part 30 includes a grip casing 310, grippers 321, x-axis moving blocks 320, a guide slot 322, an ascending/descending block 330, ascending/descending cylinders 340, and a guide housing 350.

The grip casing 310 has a hole formed at the center thereof to pass the flange 910 of the male coupler 90 therethrough. The center hole of the grip casing 310 has a given diameter capable of allowing the flange 910 of the male coupler 90 to freely pass therethrough. Further, the grip casing 310 has gripper grooves 311 for accommodating the grippers 321 therein and clamp grooves 312 for accommodating escape prevention clamps 360 as will be discussed later therein, and the gripper grooves 311 and the clamp grooves 312 are formed along the periphery of the center hole of the grip casing 310.

The grippers 321 are coupled to the grip casing 310 and thus bite the flange 910 of the male coupler 90. At least one pair of grippers 321 is provided, and as one pair of grippers 321 is closed to face each other, it fixedly comes into tight contact with the outer periphery of the flange 910 of the male coupler 90. A plurality of irregular portions may be formed on one surface of each gripper 321 facing the male coupler 90 to firmly bite the flange 910 of the male coupler 90.

The grippers 321 are fixed to the undersides of the x-axis moving blocks 320. The grippers 321 are formed integrally with the x-axis moving blocks 320 or are made separately therefrom in such a manner as to be coupled thereto. One pair of x-axis moving blocks 320 faces each other in the direction of the x-axis. If one pair of x-axis moving blocks 320 is moved to be close to each other in the direction of the x-axis, the grippers 321 fix the flange 910 of the male coupler 90 thereto, and if one pair of x-axis moving blocks 320 is moved to be distant from each other in the direction of the x-axis, the grippers 321 are released from the fixed state to the flange 910 of the male coupler 90.

The guide grooves 322 are formed obliquely on tops of the x-axis moving blocks 320. The x-axis moving blocks 320 have stepped protrusions to the shape of grooves or locking projections from tops thereof, and accordingly, the guide grooves 322 are formed obliquely from the protrusions. The protrusions are inserted into transverse grooves 351 of the guide housing 350 as will be discussed later and are then slidingly guided. The guide grooves 322 serve to guide the ascending and descending block 330 upon the operation of the ascending and descending block 330 to allow the x-axis moving blocks 320 to be moved in the direction of the x-axis.

The ascending and descending block 330 is inserted into one pair of guide grooves 322 and is thus guided upward and downward. The ascending and descending block 330 has a shape of a trapezoid whose lower portion is small and upper portion is large in such a manner as to allow both end portions to be inserted into the guide grooves 322. The ascending and descending block 330 is ascended and descended through the connection to the ascending and descending cylinders 340, and as the ascending and descending block 330 is ascended and descended, the x-axis moving blocks 320 are slidingly moved in the direction of the x-axis.

Figure 7:
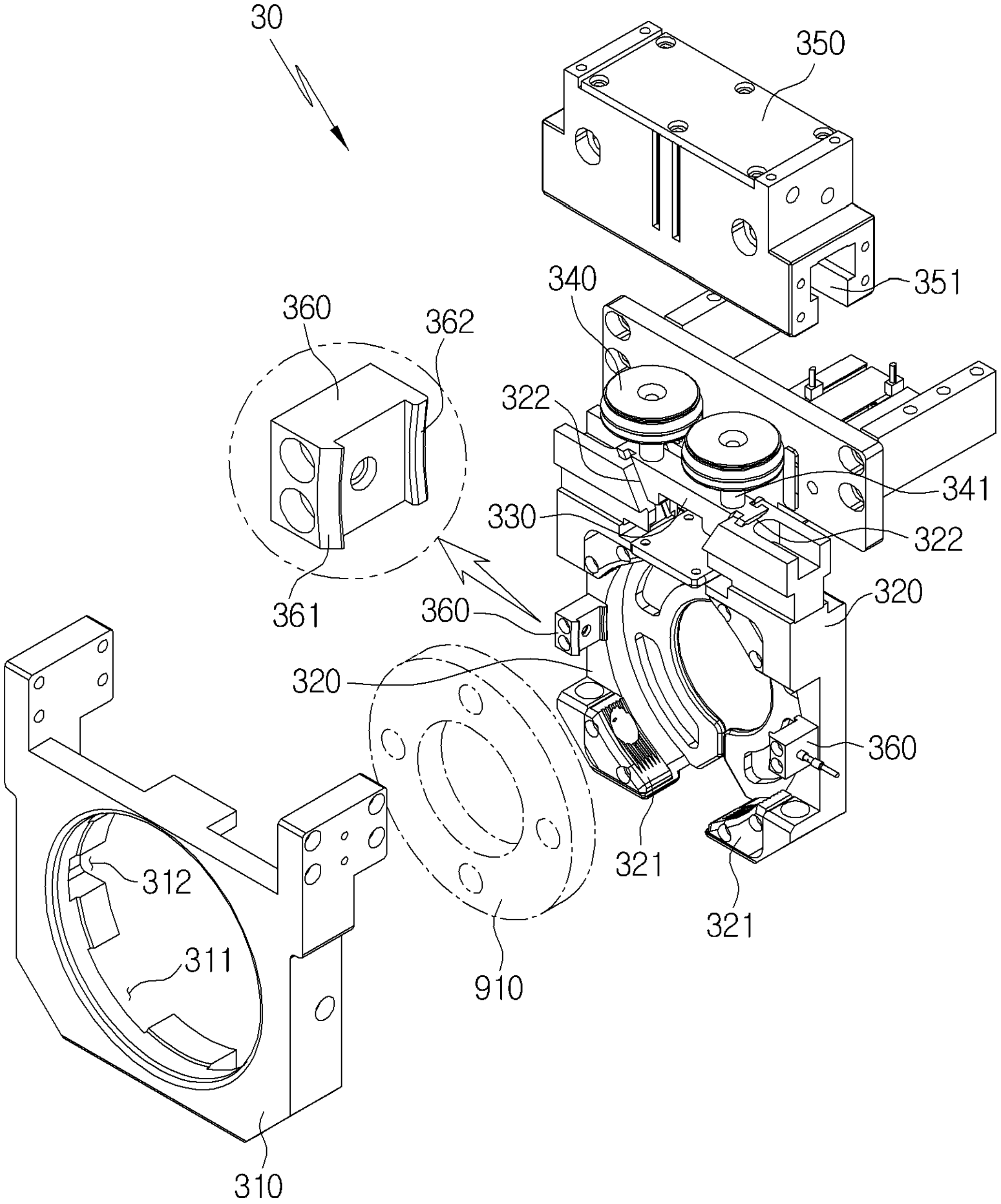
FIG. 7 is an exploded perspective view showing a grip part of the apparatus for automatic clean connection according to the present invention.
Figure 8:
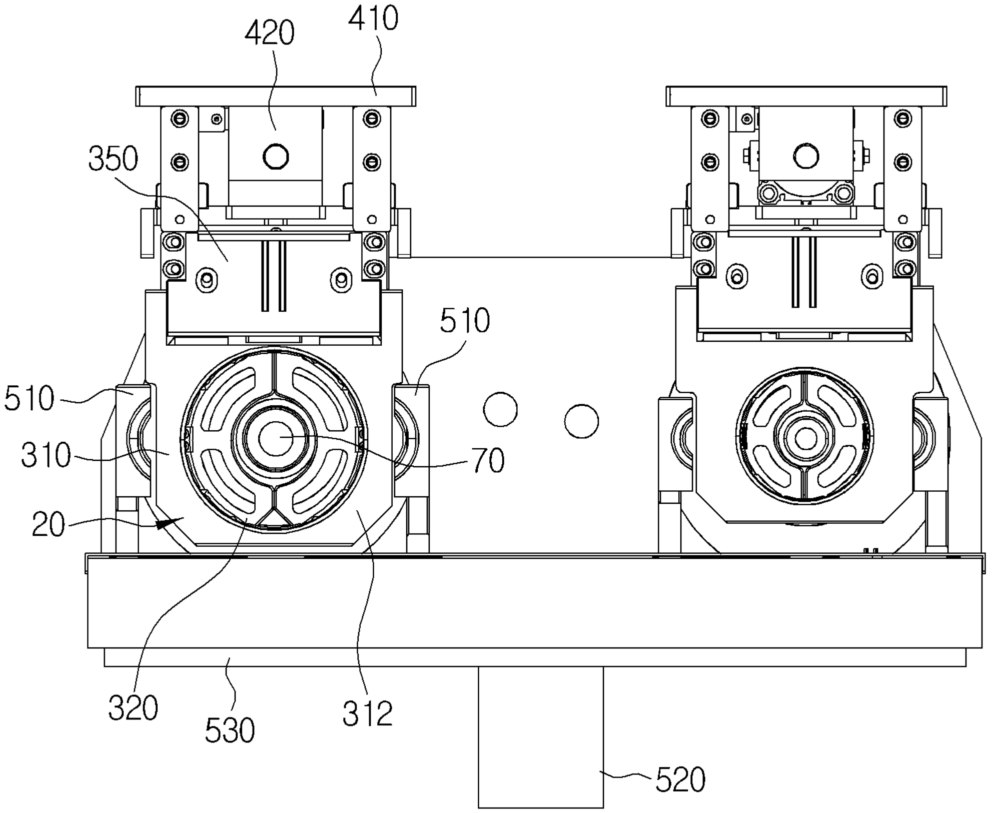
FIG. 8 is a front view showing the apparatus for automatic clean connection of FIG. 2.
Figure 9:
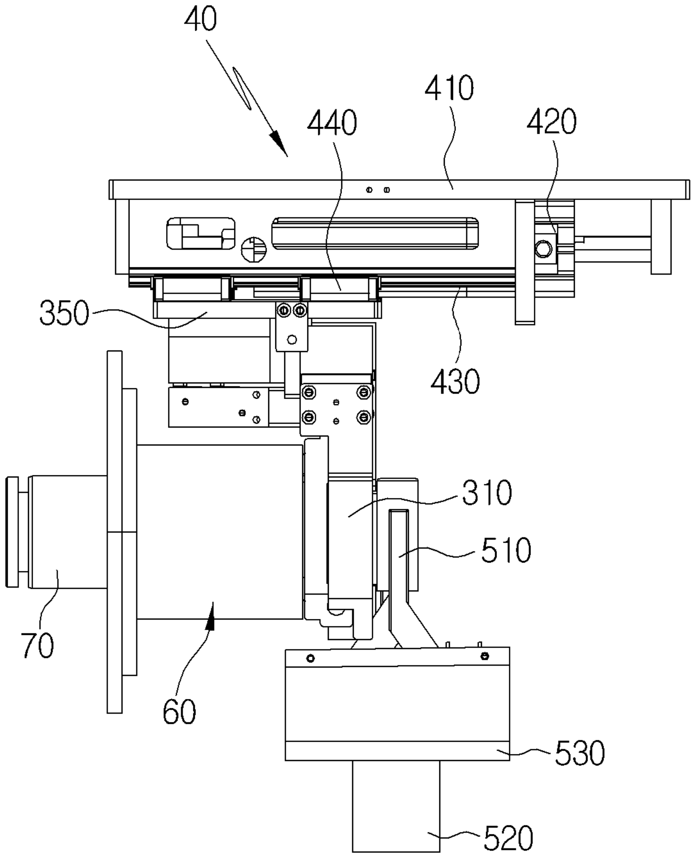
FIG. 9 is a side view showing the apparatus for automatic clean connection of FIG. 2.
Figure 10:
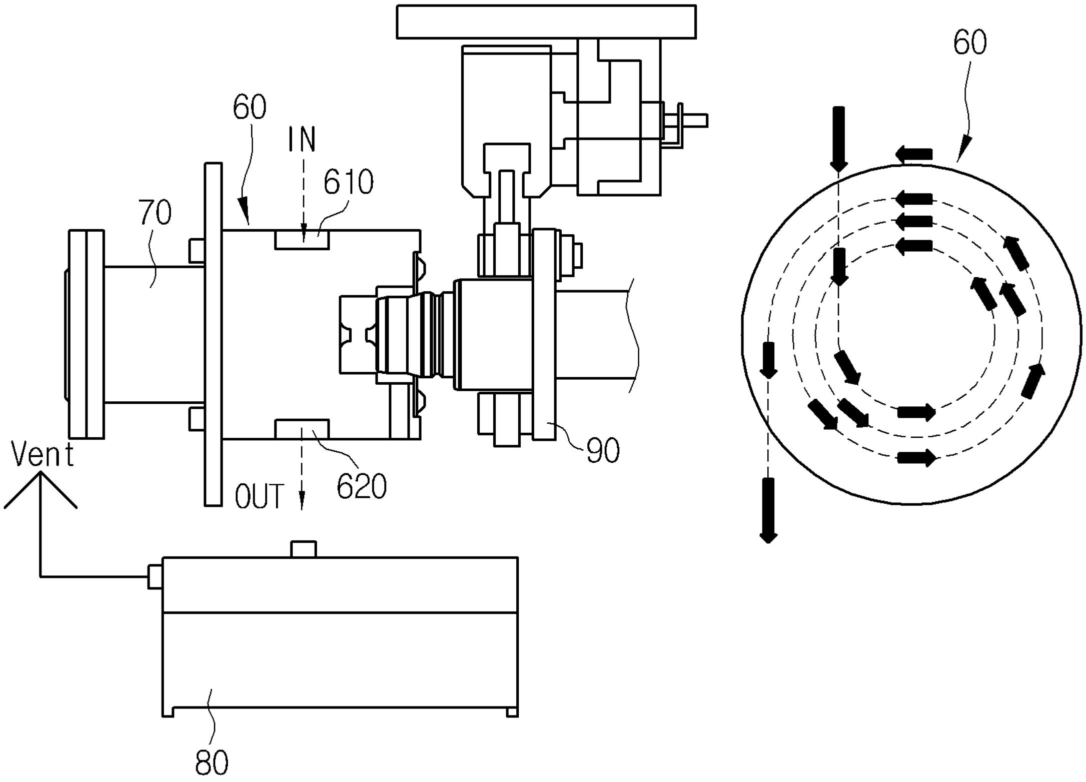
FIG. 10 is a side view showing a coupler cleaning module of the apparatus for automatic clean connection according to the present invention.

Each ascending and descending cylinder 340 has an ascending and descending rod 341 coupled to the ascending and descending block 330. End periphery of the ascending and descending rod 341 is coupled to top of the ascending and descending block 330. Each ascending and descending cylinder 340 includes a cylinder housing and a piston moving in the interior of the cylinder housing, and the cylinder housing is provided inside the guide housing 350. Referring to FIG. 7, only the pistons of the ascending and descending cylinders 340 are shown. The ascending and descending cylinders 340 provide power for ascending and descending the ascending and descending block 330.

The guide housing 350 inserts top ends of the x-axis moving blocks 320 thereinto to slidingly guide the x-axis moving blocks 320 in the direction of the x-axis. The guide housing 350 has the transverse grooves 351 extended in a transverse direction from both side surfaces thereof in the direction of the x-axis. The top side protrusions of the x-axis moving blocks 320 are inserted into the transverse grooves 351 and are thus slidingly guided therealong. The ascending and descending cylinders 340 are built in the guide housing 350.

If the ascending and descending cylinders 340 descend the ascending and descending rods 341, the ascending and descending block 330 is descended along the guide grooves 322 formed on the x-axis moving blocks 320, so that the distance between the x-axis moving blocks 320 is widen to allow the grippers 321 to grip the male coupler 90. Contrarily, if the ascending and descending cylinders 340 ascend the ascending and descending rods 341, the ascending and descending block 330 is ascended along the guide grooves 322 formed on the x-axis moving blocks 320, so that the distance between the x-axis moving blocks 320 is reduced to release the state of gripping the male coupler 90.

Further, the x-axis moving blocks 320 have the escape prevention clamps 360. The escape prevention clamps 360 are located on the respective side surfaces of one pair of x-axis moving blocks 320. The escape prevention clamps 360 protrude forward from the front surfaces of the x-axis moving blocks 320. Each escape prevention clamp 360 has support projections spaced apart from each other by the thickness of the flange 910 of the male coupler 90 in the direction of the y-axis. At the same time when the grippers 321 grip the male coupler 90, the support projections of the escape prevention clamps 360 are locked onto both end peripheries of the flange 910.

In specific, the support projections consist of a first support projection 361 and a second support projection 362. The first support projection 361 and the second support projection 362 are formed on both sides of each escape prevention clamp 360 in the direction of the y-axis. At the same time when the grippers 321 grip the male coupler 90, the first support projection 361 and the second support projection 362 are locked onto both end peripheries of the flange 910 in the direction of the y-axis, so that the male coupler 90 is not easily separated from the grip part 30, thereby increasing the fixing force to the male coupler 90.

In this case, the first support projection 361 is angled, and the second support projection 362 is tapered slantly on one surface thereof. Under the above-mentioned configurations, the gasket 920 provided between the flange 910 and the hose flange 930 of the male coupler 90 is prevented from being fittedly pressed against one surface of the second support projection 362, thereby avoiding the deformation of the gasket 920. The tapered second support projection 362 easily enters the gasket 920 so that it can be fixedly locked only onto the flange 910 of the male coupler 90.

The driving part 40 includes a y-axis moving block 440, a grip part guide rail 430, a frame 410, and driving means 420.

The y-axis moving block 440 is coupled to the guide housing 350 of the grip part 30. That is, the underside of the y-axis moving block 440 is coupled to the top of the guide housing 350. The y-axis moving block 440 is reciprocated in the direction of the y-axis with respect to the frame 410. The y-axis moving block 440 and the grip part 30 are moved in the direction of the y-axis to allow the male coupler 90 gripped by the grip part 30 to be moved in the direction of the y-axis.

The grip part guide rail 430 is coupled to the frame 410 in such a manner as to be extended long in the direction of the y-axis. The grip part guide rail 430 serves to slidingly guide the y-axis moving block 440 in the direction of the y-axis. The frame 410 is fixed to the main body 10. The driving means 420 controls the stroke of the y-axis moving block 440 to two stages to allow the male coupler 90 to be located on three positions. The driving means 420 is constituted of two air cylinders, and of course, it may be provided in other ways.

That is, the first air cylinder provides the power for one stage control, through which the y-axis moving block 440 is moved linearly with respect to the grip part guide rail 430, and the second air cylinder provides the power for two stage control, through which the first air cylinder and the y-axis moving block 440 are linearly moved, together. In this case, the first air cylinder is formed of a rodless cylinder that can be installed in a relatively small space when compared to the same stroke. Moreover, the driving means 420 may have various structures such as a linear motion (LM) guide, a ball screw, a servomotor, and so on.

The coupler cleaning module 60 serves to clean or dry the liquid contact parts of the male coupler 90 and the female coupler 70. Desirably, the coupler cleaning module 60 cleans the liquid contact parts of the male coupler 90 and the female coupler 70 and then dries them. Deionized water may be used as a cleaning liquid, and nitrogen, inert gas, etc. may be used as gas for the drying. The coupler cleaning module 60 automatically removes pollutants (chemical, odor, fume, and the like) from the liquid contact parts of the male coupler 90 and the female coupler 70, thereby providing clean environments.

The coupler cleaning module 60 has a generally cylindrical shape and surrounds the outer periphery of the female coupler 70. Further, the coupler cleaning module 60 has an inlet 610 formed on one side periphery thereof in a circumferential direction thereof, into which a cleaning or drying fluid is introduced, and an outlet 620 formed on the other side periphery thereof in the circumferential direction thereof. The fluid introduced into the inlet 610 flows to the form of cyclones to allow the interior of the coupler cleaning module 60 to be cleaned or dried, and after that, the fluid is discharged through the outlet 620 and is thus collected into a drain tank 80.

In this case, the coupler cleaning module 60 performs the cleaning or drying in a state where the male coupler 90 is close to the female coupler 70 before the male coupler 90 is completely coupled to the female coupler 70. Otherwise, the coupler cleaning module 60 performs the cleaning or drying in a state where the male coupler 90 is close to the female coupler 70 after the male coupler 90 has been separated from the female coupler 70. Under the above-mentioned configuration, the coupler cleaning module 60 efficiently cleans or dries the liquid contact parts of the male coupler 90 and the female coupler 70 in the interior thereof.

Figure 11:
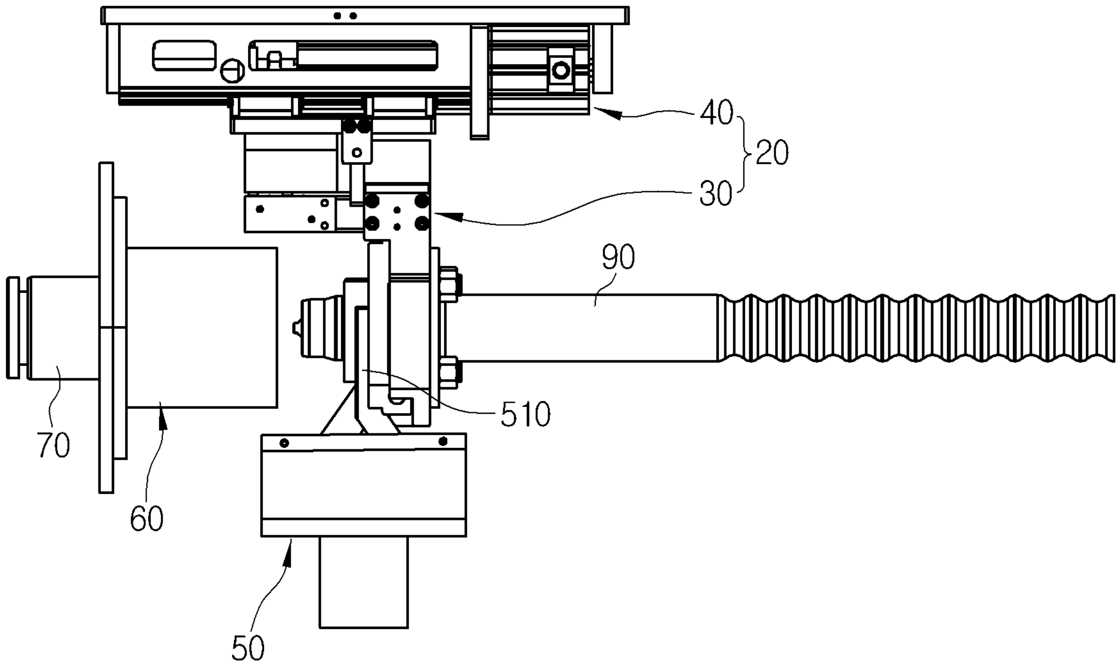
FIGS. 11 to 13 are side views showing the operating processes of the apparatus for automatic clean connection according to the present invention.
Figure 12:
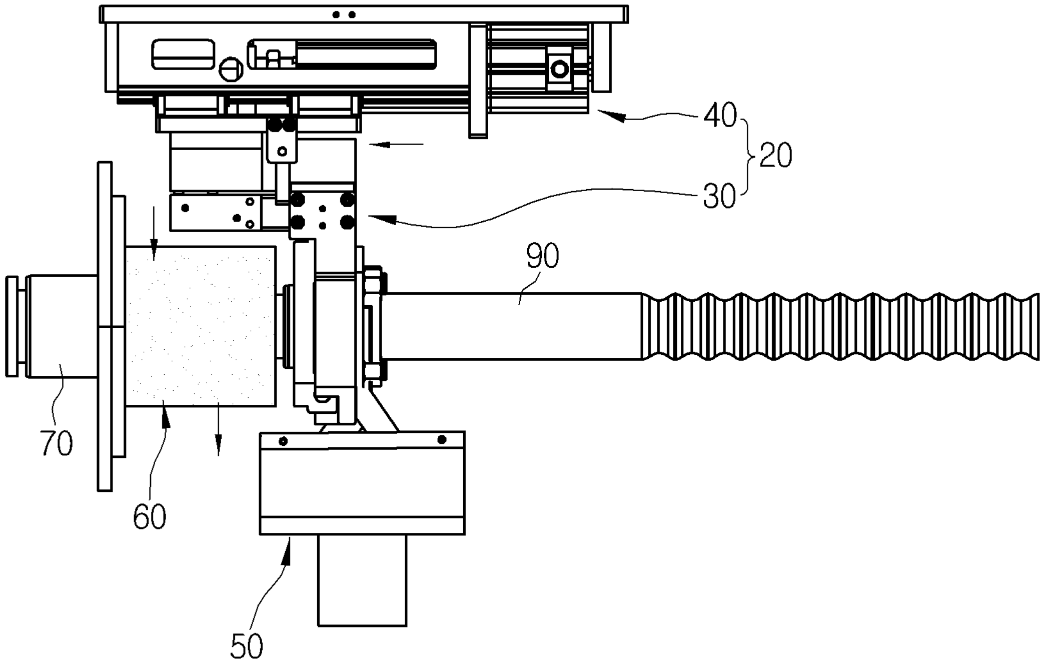
Figure 13:
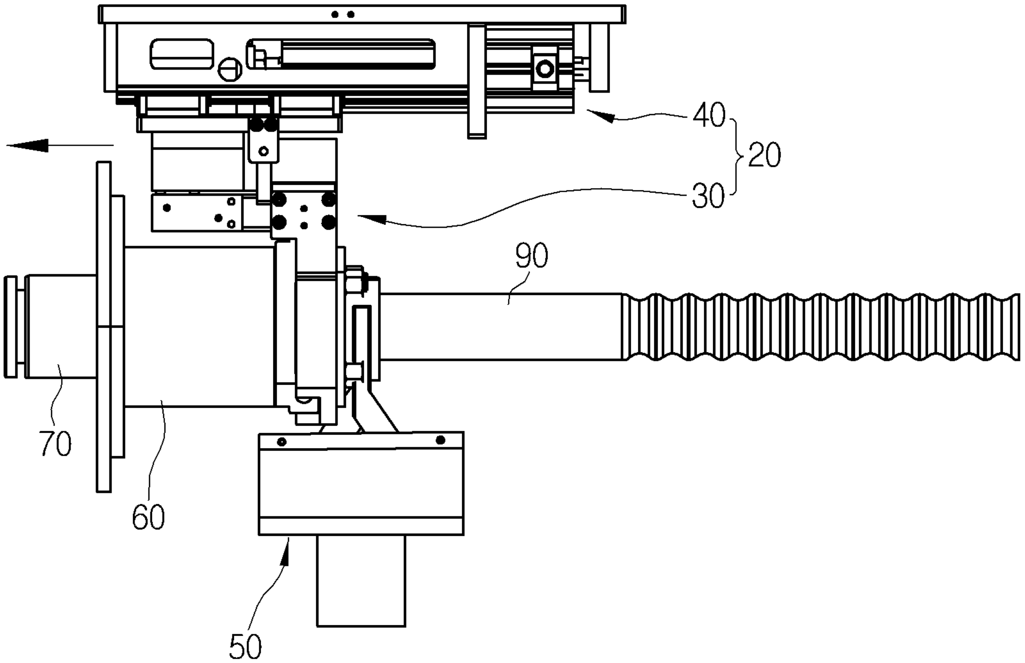

Referring to FIGS. 11 to 13, on the other hand, a method for automatic clean connection according to the present invention includes the steps of closing the alignment clamps 510 to allow the male coupler 90 to be aligned in the direction of the x-axis, operating the ascending/descending cylinders 340 to allow the grippers 321 to bite the outer periphery of the flange 910, opening the alignment clamps 510 to allow a path through which the grippers 321 pass to be provided, operating the driving means 420 to allow the male coupler 90 to move to the coupler cleaning module 60, operating the coupler cleaning module 60 to allow the liquid contact parts of the male coupler 90 and the female coupler 70 to be cleaned or dried, and operating the driving means 420 to allow the male coupler 90 to be completely fastened to the female coupler 70.

Further, the step of aligning the male coupler 90 in the direction of the x-axis includes the steps of operating the pinion driving part 520 to allow the alignment clamps 510 to be closed to one stage in the direction of the x-axis, locating the male coupler 90 between the alignment clamps 510 and operating the two-stage control cylinder 570 to allow the alignment clamps 510 to be closed to two stages in the direction of the x-axis.

In specific, the front doors of the main body 10 are open by a worker to remove a plug inserted in the female coupler 70. After that, the pinion driving part 520 operates to allow the alignment clamps 510 to be closed to one stage in the direction of the x-axis. In this state, the male coupler 90 is located between the alignment clamps 510, and the two-stage control cylinder 570 operates to allow the alignment clamps 510 to be closed to two stages in the direction of the x-axis. As a result, the male coupler 90 is aligned in the direction of the x-axis.

After the male coupler 90 has been aligned or at the same time when the male coupler 90 is aligned, the ascending/descending cylinders 340 operate to allow the grippers 321 to bite the outer periphery of the flange 910 of the male coupler 90. After that, the pinion driving part 520 operates in the opposite direction to allow the alignment clamps 510 to be open to thus ensure a path through which the grippers 321 pass. In the same manner as above, another male coupler 90 is aligned with another female coupler 70 and is thus bitten. After that, the front doors of the main body 10 are closed, and the control panel operates to perform automatic running.

If the automatic running starts, the driving means 420 operates to allow the male coupler 90 to move to the coupler cleaning module 60 being at the coupling and drying position. Next, the coupler cleaning module 60 operates to allow the liquid contact parts of the male coupler 90 and the female coupler 70 to be cleaned and dried. If the cleaning and drying are finished, the driving means 420 operates to allow the male coupler 90 to be completely fastened to the female coupler 70. After that, the chemical in the storage tank of the plant is loaded into the tank lorry, and otherwise, the chemical from the tank lorry is unloaded into the storage tank of the plant.

If the loading or uploading of the chemical is finished, the separation of the male coupler 90 is carried out in the opposite order to the above-mentioned fastening processes. First, the male coupler 90 is separated from the female coupler 70 by a given distance in a state of being close to the female coupler 70, and after that, the coupler cleaning module 60 operates to allow the liquid contact parts of the male coupler 90 and the female coupler 70 to be cleaned and dried. If the cleaning and drying are finished, the driving means 420 operates to allow the male coupler 90 to be moved to its original position.

Next, the front doors of the main body 10 are open by the worker, and the ascending/descending cylinders 340 operate to release the gripped state of the male coupler 90, thereby separating the male coupler 90 from the grip part 30. After the neighboring male coupler 90 is separated from the corresponding grip part 30, the plug is insertedly coupled to the female coupler 70. After that, the front doors of the main body 10 are closed to finish the automatic clean connection.

As described above, the apparatus and method for automatic clean connection according to the present invention can automatically remove pollutants (chemicals, odor, fume, and the like) from the liquid contact parts of the male coupler and the female coupler to provide clean environments and can efficiently clean and dry the liquid contact parts of the male coupler and the female coupler in the interior of the coupler cleaning module, so that the cleaning and drying can be performed in safe environments and the incidence rate of safety accidents can be remarkably decreased.

In addition, the apparatus and method for automatic clean connection according to the present invention can automatically perform the connection or separation of the male coupler to or from the female coupler, which is hard to be carried out by means of the worker, thereby drastically improving the productivity and minimizing the changes in the parts like couplers and gaskets in the connection and separation. Further, the fixed force of the male coupler can be maximized, thereby performing the work stably.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An apparatus for automatic clean connection, which loads or unloads chemicals from one side tank into another side tank, the apparatus comprising:

a main body having a female coupler connected to the another side tank;

a coupler connector for moving a male coupler connected to the one side tank in a direction of a y-axis to allow the male coupler to be fastened to or separated from the female coupler; and a coupler cleaner for cleaning or drying liquid contact parts of the male coupler and the female coupler, an alignment module for moving the male coupler in a direction of an x-axis to allow the male coupler to be aligned with the female coupler, wherein the alignment module comprises:

a base plate;

a pinion rotatably connected to the base plate;

a pinion rotator for rotating the pinion;

one pair of clamp guide rails extended in parallel with each other in the direction of the x-axis so as to place the pinion therebetween;

clamp sliders guided by the clamp guide rails and having racks coupled to the pinion; and alignment clamps coupled to the clamp sliders so as to align the male coupler in the direction of the x-axis.

2. The apparatus according to claim 1, wherein the coupler cleaner surrounds an outer periphery of the female coupler and has an inlet formed on one side periphery thereof in a circumferential direction to introduce a cleaning or drying fluid thereinto and an outlet formed on another side periphery thereof in the circumferential direction, so that the fluid introduced into the inlet flows in a form of cyclones to allow an interior of the coupler cleaner to be cleaned or dried.

3. The apparatus according to claim 1, wherein the coupler cleaner performs the cleaning or drying in a state where the male coupler is adjacent to the female coupler before the male coupler is completely coupled to the female coupler or after the male coupler has been separated from the female coupler.

4. The apparatus according to claim 1, wherein the alignment module further comprises a two-stage control cylinder coupled to one side of the base plate so as to restrict the clamp sliders in the direction of the x-axis or to release the restricted clamp sliders and thus to control a stroke of the clamp sliders in two stages.

5. An apparatus for automatic clean connection, which loads or unloads chemicals from one side tank into another side tank, the apparatus comprising:

a main body having a female coupler connected to the another side tank;

a coupler connection module for moving a male coupler connected to the one side tank in a direction of a y-axis to allow the male coupler to be fastened to or separated from the female coupler; and a coupler cleaner for cleaning or drying liquid contact parts of the male coupler and the female coupler, wherein the coupler connection module comprises:

a grip part for fixedly gripping a flange of the male coupler; and a grip part conveyor for moving the grip part in the direction of the y-axis, and wherein the grip part comprises:

a grip casing having a hole formed at a center thereof to pass the flange of the male coupler therethrough;

at least one pair of grippers coupled to the grip casing to bite the flange of the male coupler;

one pair of x-axis moving blocks facing each other in a direction of the x-axis, to which the grippers are fixed;

guide grooves formed obliquely on tops of the x-axis moving blocks;

an ascending and descending block inserted into the guide grooves so as to be guided upward and downward;

ascending and descending cylinders having ascending and descending rods coupled to the ascending and descending block; and a guide housing inserted into top ends of the x-axis moving blocks to slidingly guide the x-axis moving blocks in the direction of the x-axis.

6. The apparatus according to claim 5, wherein the x-axis moving blocks have escape prevention clamps located on respective side surfaces thereof, and each escape prevention clamp has support projections spaced apart from each other by a thickness of the flange of the male coupler in the direction of the y-axis, so that at the same time when the grippers grip the male coupler, the support projections are locked onto both end peripheries of the flange of the male coupler.

7. The apparatus according to claim 5, wherein the grip part conveyor comprises:

a y-axis moving block to which the guide housing is coupled;

a grip part guide rail for slidingly guiding the y-axis moving block in the direction of the y-axis;

a frame to which the grip part guide rail is coupled; and a controller for controlling a stroke of the y-axis moving block in two stages.

* * * * *